(12) United States Patent
Yamamoto et al.

(10) Patent No.: US 10,124,630 B2
(45) Date of Patent: Nov. 13, 2018

(54) TIRE

(71) Applicant: SUMITOMO RUBBER INDUSTRIES, LTD., Kobe-shi, Hyogo (JP)

(72) Inventors: Aiko Yamamoto, Kobe (JP); Kazuma Mori, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 328 days.

(21) Appl. No.: 14/987,449

(22) Filed: Jan. 4, 2016

(65) Prior Publication Data
US 2016/0200150 A1 Jul. 14, 2016

(30) Foreign Application Priority Data

Jan. 13, 2015 (JP) ................................ 2015-004194
Feb. 12, 2015 (JP) ................................ 2015-025058

(51) Int. Cl.
*B60C 15/00* (2006.01)
*B60C 15/06* (2006.01)
(Continued)

(52) U.S. Cl.
CPC ............ *B60C 15/06* (2013.01); *B60B 21/104* (2013.01); *B60C 9/02* (2013.01); *B60C 11/00* (2013.01); *B60C 13/00* (2013.01); *B60C 15/0009* (2013.01); *B60C 15/0206* (2013.01); *B60C 15/04* (2013.01); *B60C 15/0603* (2013.01); *B60C 15/0607* (2013.01); *B60C 2015/061* (2013.01); *B60C 2015/0614* (2013.01); *B60C 2015/0621* (2013.01)

(58) Field of Classification Search
CPC ..... B60C 15/00; B60C 15/0009; B60C 15/06; B60C 15/0603
See application file for complete search history.

(56) References Cited

U.S. PATENT DOCUMENTS 6,543,504 B2 * 4/2003 Auxerre .................... B60C 3/04
152/539
2013/0133806 A1 5/2013 Amano et al.
2014/0000780 A1 1/2014 Bruneau et al.

FOREIGN PATENT DOCUMENTS

EP 2376295 * 10/2013
JP 2002-160510 * 6/2002
(Continued)

*Primary Examiner* — Justin R Fischer
(74) *Attorney, Agent, or Firm* — Birch, Stewart, Kolasch & Birch, LLP (57) ABSTRACT

A normal rim 48 includes a flange 54. The flange 54 forms an outer circumferential bent surface 60 that is bent with a radius Rr of curvature. A first reference line L1 represents a straight line that extends through a center point Pr of the radius Rr, and that is tilted by an angle of 45°. In a state where the tire is inflated to a normal internal pressure and is under 120% of a normal load, Te represents a thickness from an inner cavity surface to an outer surface of the clinch, Tf1 represents a thickness of a filler, Tc1 represents a thickness of the clinch, Ta1 represents a thickness obtained by the thickness Tf1 and the thickness Tc1 being added, and the thicknesses are measured along the first reference line L1, and a ratio (Ta1/Te) of the thickness Ta1 to the thickness Te is greater than 0.4.

11 Claims, 6 Drawing Sheets

(51) Int. Cl.
*B60B 21/10* (2006.01)
*B60C 9/02* (2006.01)
*B60C 11/00* (2006.01)
*B60C 13/00* (2006.01)
*B60C 15/02* (2006.01)
*B60C 15/04* (2006.01)

(56) References Cited

FOREIGN PATENT DOCUMENTS

| | | | |
|---|---|---|---|
| JP | 2002-293113 A | | 10/2002 |
| JP | 2003-54226 A | | 2/2003 |
| JP | 2013-169825 A | | 9/2013 |
| JP | 2014-091508 | * | 5/2015 |
| WO | WO 2015/072322 A1 | | 5/2015 |

* cited by examiner

TIRE

THIS APPLICATION CLAIMS PRIORITY ON PATENT

Application No. 2015-004194 filed in JAPAN on Jan. 13, 2015 and Patent Application No. 2015-025058 filed in JAPAN on Feb. 12, 2015. The entire contents of these Japanese Patent Applications are hereby incorporated by reference.

BACKGROUND OF THE INVENTION

Field of the Invention

The present invention relates tires to be mounted to vehicles.

Description of the Related Art

A tire includes a tread, sidewalls, beads, and the like. Each bead includes a core, and an apex that extends from the core in the radial direction. The apex contributes to improvement of stiffness and durability of the tire. In general, from the viewpoint of improvement of stiffness and durability, the height of the apex is increased to some degree. In particular, in a tire that is to be under heavy load, the height of the apex is increased.

When the vehicle runs, the tire rolls on a road surface. The ground contact surface of the tire varies in the circumferential direction. Deformed portions in the tread, the sidewalls, the carcass, and the like of the tire vary in the circumferential direction. Deformation of each portion of the tire is periodically repeated due to varying of the deformed portions. In the sidewalls and the beads, load applied around portions that contact the ground, and load applied to the other portions are different. The periodic deformation causes increase of distortion and heat generation in the tire. The increase of distortion and heat generation causes reduction of durability of the tire. Further, in a tire in which the height of the apex is increased, damage such as separation may occur around the apex, and durability of the tire is likely to be reduced.

In JP2013-545671 (US2014/0000780) and WO2012/18106 (US2013/0133806), tires are disclosed which include: apexes each having a reduced height; and fillers and the like provided outward of the apexes in the axial direction. In these tires, deformation of the apexes can be reduced.

Also in these tires, when load thereon is heavy, great deformation of the leading end portion of the apex is repeated. In particular, near a radially outer edge at which the tire and a flange of a rim contact each other, the deformation is likely to be increased, and distortion and heat generation may be increased. Also in these tires, enhanced improvement is required in view of durability. In particular, for the tire which is to be under heavy load, enhanced improvement of durability is required. An object of the present invention is to provide a tire excellent in durability.

The apex is formed of a highly hard crosslinked rubber. The apex contributes to improvement of stiffness of the tire. In a case where the highly hard apex is left in a certain deformed state for a long time period, permanent set may occur. In the tire in which the height of the apex is increased, the permanent set may cause deformation of the sidewalls and the tread. The deformation of the tread is referred to as a so-called flat spot. In order to reduce generation of the flat spot, the height of the apex is advantageously reduced.

Tires in which the height of apexes is reduced are disclosed in, for example, JP2013-169825, JP2013-545671 (US2014/0000780), and WO2012/18106 (US2013/0133806). Reduction of the height of the apex allows generation of the flat spot to be reduced.

Meanwhile, when the height of the apex is excessively reduced, or the apex is excessively thin, durability or handling stability of the tire may be deteriorated. The height and the thickness of the apex exert influence also on durability and handling stability of the tire. Some prior art documents disclose tires in which fillers or the like are disposed outward of the apexes in the axial direction. In these tires, deterioration of durability or handling stability of the tire is reduced by using apexes and fillers or the like in combination.

However, it is not easy to simultaneously achieve reduction of generation of a flat spot, improvement of durability, and improvement of handling stability even in these tires. Another object of the present invention is to provide a tire that is excellent in durability and handling stability and simultaneously allows generation of a flat spot to be reduced.

SUMMARY OF THE INVENTION

A pneumatic tire according to the present invention includes: a tread; a pair of sidewalls; a pair of clinches; a pair of beads; a carcass; and a pair of fillers. Each sidewall extends almost inward from an end of the tread in a radial direction. Each clinch is disposed inward of a corresponding one of the sidewalls in the radial direction. Each bead is disposed inward of a corresponding one of the clinches in an axial direction. Each bead includes a core, and an apex that extends outward from the core in the radial direction. The carcass extends along inner sides of the tread and the sidewalls, and is extended on and between one of the beads and the other of the beads. The carcass includes a carcass ply. The carcass ply is turned up around the core from an inner side toward an outer side in the axial direction. The carcass ply includes: a main portion disposed inward of the beads in the axial direction; and turned-up portions disposed outward of the beads in the axial direction. Each filler is disposed between a corresponding one of the clinches and a corresponding one of the turned-up portions in the axial direction. A normal rim to which the tire is mounted, includes a flange. The flange forms an outer circumferential bent surface that is bent with a radius Rr of curvature. A radially outer side edge that contacts a corresponding one of the clinches is positioned on the outer circumferential bent surface. A first reference line L1 represents a straight line that extends through a center point Pr of a circle represented by the radius Rr of curvature, and that is tilted, by an angle of 45° relative to the axial direction, from an inner side in the radial direction toward an outer side in the radial direction and toward an inner side in the axial direction.

The tire is mounted to the normal rim, is inflated to a normal internal pressure, and is under 120% of a normal load. In this state, Te represents a thickness from an inner cavity surface to an outer surface of a corresponding one of the clinches, Tf1 represents a thickness of each filler, Tc1 represents a thickness of each clinch, and Ta1 represents a thickness obtained by the thickness Tf1 and the thickness Tc1 being added. In this state, the thicknesses Te, Tf1, Tc1, and Ta1 are measured along the first reference line L1. In this case, a ratio (Ta1/Te) of the thickness Ta1 to the thickness Te is greater than 0.4.

Preferably, a ratio (Tf1/Tc1) of the thickness Tf1 to the thickness Tc1 is greater than or equal to 0.3 and not greater than 3.0.

Preferably, an outer end, of each turned-up portion, in the radial direction is disposed outward of the first reference line L1 in the radial direction. When Dr1 represents a distance from the inner cavity surface to a center point Pp of a thickness of each turned-up portion along the first reference line L1, a ratio (Dr1/Te) of the distance Dr1 to the thickness Te is less than or equal to 0.6.

Preferably, a second reference line L2 represents a straight line that extends through a center of the core in the axial direction. In a state where the tire is mounted to the normal rim, is inflated to a normal internal pressure, and is under 120% of a normal load, Tp2 represents a thickness of the carcass ply, Tf2 represents a thickness of each filler, Tc2 represents a thickness of each clinch, Ta2 represents a thickness obtained by the thickness Tf2 and the thickness Tc2 being added, and the thicknesses Tp2, Tf2, Tc2, and Ta2 are measured along the second reference line L2. In this case, the thickness Ta2 is greater than or equal to the thickness Tp2, and is not greater than three times the thickness Tp2.

Preferably, the thickness Tf2 is greater than 0, and is less than or equal to the thickness Tc2.

Preferably, Tp1 represents a thickness of the carcass ply and the thickness Tp1 is measured along the first reference line L1. In this case, the thickness Ta1 is greater than or equal to twice the thickness Tp1.

Preferably, a radially outer end of the apex is disposed inward of the first reference line L1 in the radial direction.

Preferably, the tire includes a strip. The strip is layered over the apex. The strip extends outward from an end of the apex in the radial direction. A radially outer end of the strip is disposed outward of the first reference line L1 in the radial direction.

Preferably, in the tire, an inner end of each filler in the radial direction is disposed inward of an outer end of the core.

In the tire according to the present invention, when the tire is deformed due to heavy load being applied in the radial direction, compressive stress is less likely to act in the turned-up portions of the carcass. In this tire, damage of the carcass and the apex in a region in which repeated deformation is maximum is less likely to occur. This tire is excellent in durability.

Another pneumatic tire according to the present invention includes: a tread; a pair of sidewalls; a pair of clinches; a pair of beads; a carcass; and a pair of fillers. Each sidewall extends almost inward from an end of the tread in a radial direction. Each clinch is disposed inward of a corresponding one of the sidewalls in the radial direction. Each bead is disposed inward of a corresponding one of the clinches in an axial direction. Each bead includes a core, and an apex that extends outward from the core in the radial direction. The carcass extends along inner sides of the tread and the sidewalls, and is extended on and between one of the beads and the other of the beads. The carcass includes a carcass ply. The carcass ply is turned up around the core from an inner side toward an outer side in the axial direction. The carcass ply includes: a main portion disposed inward of the beads in the axial direction; and turned-up portions disposed outward of the beads in the axial direction. Each filler is disposed between a corresponding one of the clinches and a corresponding one of the turned-up portions in the axial direction.

A normal rim to which the tire is mounted, includes a flange. The flange forms an outer circumferential bent surface that is bent with a radius Rr of curvature. A radially outer side edge that contacts a corresponding one of the clinches is positioned on the outer circumferential bent surface. A first reference line L1 represents a straight line that extends through a center point Pr of a circle represented by the radius Rr of curvature, and that is tilted, by an angle of 45° relative to the axial direction, from an inner side in the radial direction toward an outer side in the radial direction and toward an inner side in the axial direction. A fourth reference line L4 represents a straight line that extends, through a center of the core, parallel to the first reference line L1. A fifth reference line L5 represents a straight line that extends such that the straight line and the fourth reference line L4 are line-symmetric with respect to the first reference line L1.

In a state where the tire is mounted to the normal rim, is inflated to a normal internal pressure, and is under 120% of a normal load, each filler extends from a portion inward of the first reference line L1 in the radial direction to a portion outward of the fifth reference line L5 in the radial direction. In this state, a ratio (Sf/St) of an area Sf of each filler between the first reference line L1 and the fifth reference line L5 relative to an area St of the tire between the first reference line L1 and the fifth reference line L5, is less than or equal to 0.3. An end of the apex is disposed inward of the first reference line L1 in the radial direction.

Preferably, the end of the apex is disposed outward of the flange of the normal rim in the radial direction.

Preferably, Hp represents a height of an outer end of each turned-up portion of the carcass ply, and Hf represents a height of an outer end of each filler. In this case, the height Hp is greater than the height Hf. A ratio ((Hp−Hf)/Hp) of a difference (Hp−Hf) of the height Hf from the height Hp relative to the height Hp is greater than or equal to 0.05.

Preferably, the tire includes a strip. The strip is layered over the apex. The strip extends outward from the end of the apex in the radial direction. An outer end of the strip is disposed outward of the first reference line L1 in the radial direction. A thickness of the strip is greater than 0 and less than or equal to 2 mm.

In another tire according to the present invention, the apexes and the fillers are disposed at appropriate positions in appropriate ranges. Thus, generation of a flat spot is reduced. The tire is excellent also in durability and handling stability.

DESCRIPTION OF THE PREFERRED EMBODIMENTS

The following will describe in detail the present invention based on preferred embodiments with reference to the accompanying drawing.

Figure 1:
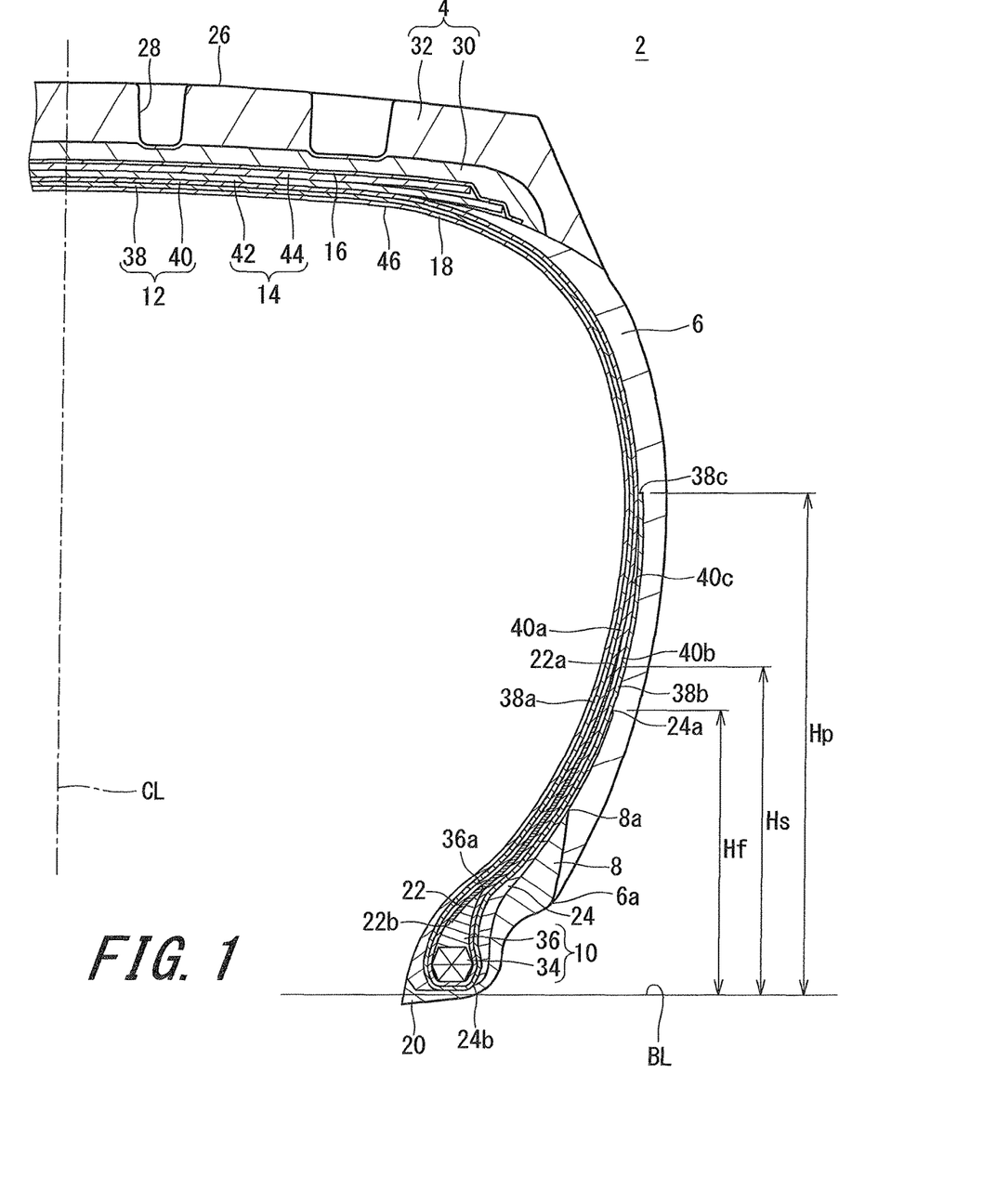
FIG. 1 is a cross-sectional view of a portion of a pneumatic tire according to an embodiment of the present invention.

FIG. 1 illustrates a pneumatic tire 2. In FIG. 1, the up-down direction represents the radial direction of the tire 2, the right-left direction represents the axial direction of the tire 2, and the direction perpendicular to the surface of the sheet represents the circumferential direction of the tire 2. An alternate long and short dash line CL represents the equator plane of the tire 2. A solid line BL represents the bead base line of the tire 2. The bead base line is a line for defining a diameter of a rim (see JATMA). The tire 2 has a shape which is symmetric about the equator plane except for a tread pattern.

The tire 2 includes a tread 4, a pair of sidewalls 6, a pair of clinches 8, a pair of beads 10, a carcass 12, a belt 14, a band 16, an inner liner 18, a pair of chafers 20, a pair of strips 22, and a pair of fillers 24. The tire 2 is of a tubeless type. The tire 2 is mounted to, for example, a light truck. In the description herein, the tire 2 is described as an exemplary tire. However, the tire 2 of the present invention is widely applicable to various types of vehicles. The tire 2 may be implemented as a tire having a tube.

The tread 4 has a shape that projects outward in the radial direction. The tread 4 forms a tread surface 26 that can contact a road surface. The tread 4 has grooves 28 formed therein. A tread pattern is formed by the grooves 28. The tread 4 has a base layer 30 and a cap layer 32. The cap layer 32 is disposed outward of the base layer 30 in the radial direction. The cap layer 32 is layered over the base layer 30. The base layer 30 is formed of a crosslinked rubber excellent in adhesiveness. A typical base rubber of the base layer 30 is a natural rubber. The cap layer 32 is formed of a crosslinked rubber excellent in wear resistance, heat resistance, and grip performance.

Each sidewall 6 extends almost inward from the end of the tread 4 in the radial direction. The outer ends, in the radial direction, of the sidewalls 6 are joined to the tread 4. The inner ends, in the radial direction, of the sidewalls 6 are jointed to the clinches 8. The sidewalls 6 are formed of a crosslinked rubber excellent in cut resistance and weather resistance. The sidewalls 6 prevent the carcass 12 from being damaged.

Each clinch 8 is disposed almost inward of the sidewall 6 in the radial direction. Each clinch 8 is disposed outward of the bead 10 and the carcass 12 in the axial direction. The clinches 8 are formed of a crosslinked rubber excellent in wear resistance.

Each bead 10 is disposed inward of the clinch 8 in the axial direction. Each bead 10 includes a core 34, and an apex 36 that extends outward from the core 34 in the radial direction. The core 34 is ring-shaped, and includes a non-stretchable wound wire. A typical material of the wire is a steel.

The apex 36 is tapered outward in the radial direction. The apex 36 is formed of a highly hard crosslinked rubber. In view of reducing deformation of the apex 36, a complex elastic modulus E*a of the apex 36 is preferably higher than or equal to 20 MPa. In view of suppressing reduction of ride comfort, the complex elastic modulus E*a is preferably not higher than 60 MPa.

The height of the apex 36 in the radial direction is less than the height of a general apex. An end 36a of each apex 36 is disposed inward of a position of the end of the general apex in the radial direction. The apex 36 is referred to as a so-called small apex.

The carcass 12 includes a first ply 38 and a second ply 40. Each of the first ply 38 and the second ply 40 is extended, along the tread 4 and the sidewalls 6, on and between the beads 10 on both sides. The first ply 38 is turned up around each core 34 from the inner side toward the outer side in the axial direction. By the first ply 38 being turned up, the first ply 38 includes: a main portion 38a disposed inward of the beads 10 on both the sides in the axial direction; and turned-up portions 38b disposed outward of the beads 10 in the axial direction. The second ply 40 is turned up around each core 34 from the inner side toward the outer side in the axial direction. By the second ply 40 being turned up, the second ply 40 includes: a main portion 40a disposed inward of the beads 10 on both the sides in the axial direction; and turned-up portions 40b disposed outward of the beads 10 in the axial direction. Ends 38c of the turned-up portions 38b of the first ply 38 are disposed outward of ends 40c of the turned-up portions 40b of the second ply 40 in the radial direction.

The first ply 38 and the second ply 40 are each formed of multiple cords aligned with each other, and a topping rubber. An absolute value of an angle of each cord relative to the equator plane ranges from 75° to 90°. In other words, the carcass 12 forms a radial structure. The cords are formed of an organic fiber. Preferable examples of the organic fiber include polyester fibers, nylon fibers, rayon fibers, polyethylene naphthalate fibers, and aramid fibers. The carcass 12 includes two plies, that is, the first ply 38 and the second ply 40. However, the carcass 12 may be formed of one ply, or may be formed of three, four, or more plies.

The belt 14 is disposed inward of the tread 4 in the radial direction. The belt 14 is layered over the carcass 12. The belt 14 reinforces the carcass 12. The belt 14 includes an inner layer 42 and an outer layer 44. The width of the inner layer 42 is slightly greater than the width of the outer layer 44 in the axial direction. Each of the inner layer 42 and the outer layer 44 includes multiple cords aligned with each other, and a topping rubber, which are not shown. Each cord is tilted relative to the equator plane. A typical absolute value of the tilt angle is greater than or equal to 10°, and not greater than 35°. A direction in which the cords of the inner layer are tilted relative to the equator plane is opposite to a direction in which the cords of the outer layer are tilted relative to the equator plane. The material of the cords is preferably a steel. An organic fiber may be used for the cords. The width of the belt 14 in the axial direction is preferably greater than or equal to 0.7 times the maximum width of the tire 2. The belt 14 may have three or more layers.

The band 16 is disposed outward of the belt 14 in the radial direction. The width of the band 16 is greater than the width of the belt 14 in the axial direction. The band 16 includes a cord and a topping rubber, which are not shown. The cord is helically wound. The band 16 has a so-called jointless structure. The cord extends substantially in the circumferential direction. An angle of the cord relative to the circumferential direction is less than or equal to 5°, and more preferably less than or equal to 2°. The belt 14 is held by the cord, thereby reducing lifting of the belt 14. The cord is formed of an organic fiber. Preferable examples of the organic fiber include nylon fibers, polyester fibers, rayon fibers, polyethylene naphthalate fibers, and aramid fibers.

The inner liner 18 is disposed inward of the carcass 12. The inner liner 18 is jointed to the inner surface of the carcass 12 near the equator plane. The inner liner 18 forms an inner cavity surface 46 that is the inner side surface of the tire 2. The inner liner 18 is formed of a crosslinked rubber excellent in airtightness. A typical base rubber of the inner liner 18 is an isobutylene-isoprene-rubber or halogenated isobutylene-isoprene-rubber. The inner liner 18 maintains internal pressure of the tire 2.

Each chafer 20 is disposed near the bead 10. When the tire 2 is mounted to a rim, the chafer 20 contacts the rim on the radially inner side. A region near each bead 10 is protected due to the contact of the chafer 20. The chafers 20 are integrated with the clinches 8. Therefore, the material of the chafers 20 is the same as the material of the clinches 8. The chafer 20 may be a component which is separate from the clinch 8. For example, the chafers 20 may be formed of a fabric and a rubber impregnated into the fabric.

Each strip 22 extends outward from the apex 36 in the radial direction. Each strip 22 is disposed between the main portion 40a and the turned-up portion 40b of the second ply 40 in the axial direction. Each strip 22 is disposed between the main portion (the main portion 38a and the main portion 40a) and the turned-up portion (the turned-up portion 38b and the turned-up portion 40b) of the carcass ply (the first ply 38 and the second ply 40) of the carcass 12. Each strip 22 is formed of a sheet-shaped crosslinked rubber. Each strip 22 is formed of a highly hard crosslinked rubber.

Radially outer ends 22a of the strips 22 are disposed inward of the outer ends 40c of the second ply 40 in the radial direction. Each outer end 22a is disposed between the main portion 40a and the turned-up portion 40b of the second ply 40. The outer end 22a is disposed outward of an inner end 6a of each sidewall 6 in the radial direction. A radially inner end 22b of each strip 22 is disposed inward of the end 36a of the apex 36 in the radial direction. The inner end 22b may be disposed inward of the outer end of the core 34 in the radial direction. The radially inner side portion of each strip 22 is layered over the axially inner side surface of the apex 36. The radially inner side portion of each strip 22 may be layered over the axially outer side surface of the apex 36.

The tire 2 in which a complex elastic modulus E*s of the strip 22 is high, is excellent in stiffness. Thus, flexure can be reduced. The strips 22 allow deformation of the tire 2 to be reduced. The tire 2 is excellent in durability. In this viewpoint, the complex elastic modulus E*s of the strip 22 is preferably higher than or equal to 20 MPa. Meanwhile, in the tire 2 in which the complex elastic modulus E*s is low, ride comfort is less likely to be reduced. In this viewpoint, the complex elastic modulus E*s is preferably not higher than 60 MPa.

Each filler 24 is disposed inward of the clinch 8 in the axial direction. Each filler 24 is disposed outward of the turned-up portion 38b of the first ply 38 in the axial direction. Each filler 24 is disposed outward of the turned-up portion 40b of the second ply 40 in the axial direction. In other words, each turned-up portion 38b and each turned-up portion 40b are disposed between: the strip 22 and the apex 36; and the filler 24 in the axial direction. The axially inner surface of each filler 24 is bent so as to project axially inward. Each filler 24 is tapered radially outward. Each filler 24 is tapered radially inward.

An outer end 24a of each filler 24 is disposed outward of the end 36a of the apex 36 in the radial direction. The outer end 24a is disposed outward of an outer end 8a of each clinch 8 in the radial direction. The outer end 24a is disposed between each sidewall 6 and the carcass 12. The outer end 24a may be disposed inward of the outer end 8a of each clinch 8 in the radial direction. A radially inner end 24b of each filler 24 is disposed inward of the end 36a of the apex 36 in the radial direction. The inner end 24b is disposed inward of the inner end of the core 34 in the radial direction. In the tire 2, each filler 24 is disposed between the clinch 8 and the carcass 12 in the axial direction. The radially inner side portion of each filler 24 is covered by the clinch 8. The inner end 24b may be disposed outward of the center of the core 34 in the radial direction.

The fillers 24 are formed of a highly hard crosslinked rubber. The tire 2 in which a complex elastic modulus E*f of the filler 24 is high, is excellent in stiffness. Thus, flexure can be effectively reduced. Each filler 24 allows deformation of the apex 36 to be reduced. The tire 2 is excellent in durability. In this viewpoint, the complex elastic modulus E*f is preferably higher than or equal to 15 MPa. Meanwhile, in the tire 2 in which the complex elastic modulus E*f is low, ride comfort is less likely to be reduced. In this viewpoint, the complex elastic modulus E*f is preferably not higher than 75 MPa.

A double-headed arrow Hs in FIG. 1 represents the height of the outer end 22a of each strip 22. A double-headed arrow Hf represents the height of the outer end 24a of each filler 24. A double-headed arrow Hp represents the height of the end 38c of each turned-up portion of the first ply 38. In the present invention, the height Hp is measured by using the carcass ply which has the end, of its turned-up portion, disposed at the outermost position in the radial direction, among the carcass plies that are turned up around the core 34 from the inner side toward the outer side in the axial direction. The height Hs, the height Hf, and the height Hp are each measured as a distance in straight line from the bead base line in the radial direction.

Figure 2:
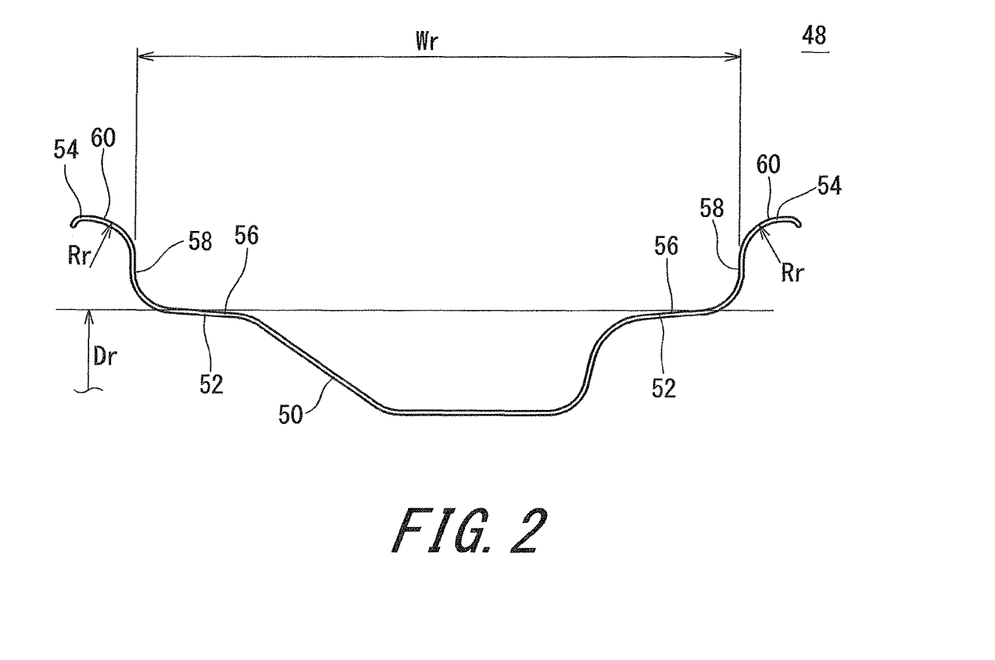
FIG. 2 illustrates a portion of a normal rim to which the tire shown in FIG. 1 is mounted.

FIG. 2 illustrates a portion of a rim 48 to which the tire 2 is mounted. The rim 48 is a normal rim for the tire 2. The rim 48 is a "standard rim" in the JATMA standard. In FIG. 2, the up-down direction represents the radial direction, the right-left direction represents the axial direction, and the direction perpendicular to the surface of the sheet represents the circumferential direction. The rim 48 includes a well 50, bead seats 52, and flanges 54. The well 50, the bead seats 52, and the flanges 54 are formed so as to be tubular by one winding in the circumferential direction. On the cross-section shown in FIG. 2, the well 50 is recessed radially inward at almost the center in the axial direction. The bead seats 52 extend axially outward from the well 50. The flanges 54 extend radially outward from the axially outer sides of the bead seats 52. The radially outer end portions of the flanges 54 extend so as to be bent axially outward.

Each bead seat 52 includes a seat surface 56. The seat surface 56 is formed by an outer circumferential surface of each bead seat 52. The flanges 54 include contact surfaces 58 and outer circumferential bent surfaces 60. Each contact surface 58 extends radially outward from the seat surface 56. One of the contact surfaces 58 in the axial direction and the other of the contact surfaces 58 in the axial direction, oppose each other. Each outer circumferential bent surface 60 extends from the contact surface 58 so as to be bent axially outward. Each outer circumferential bent surface 60 is formed so as to have an arc-shaped outline on the cross-section perpendicular to the circumferential direction. When the tire 2 is mounted to the rim 48, the chafers 20 contact the seat surfaces 56, and the clinches 8 contact the contact surfaces 58 and the outer circumferential bent surfaces 60.

A single-headed arrow Dr in FIG. 2 represents a diameter of the rim. A double-headed arrow Wr represents a width of the rim. The width Wr of the rim is measured as a distance, in the axial direction, from one of the contact surfaces 58 to the other of the contact surfaces 58 in the axial direction. A single-headed arrow Rr represents a radius of curvature of the outer circumferential bent surface 60. The diameter Dr of the rim, the width Wr of the rim, and the radius Rr of curvature are defined in the JATMA standard with which the rim 48 complies.

In the description herein, the rim 48 is illustrated as a "standard rim" in the JATMA standard. Also in the "Design Rim" in the TRA standard, and the "Measuring Rim" in the ETRTO standard, surfaces corresponding to the seat surfaces 56, the contact surfaces 58, and the outer circumferential bent surfaces 60 of the rim 48 are formed. The radius of curvature corresponding to the radius Rr of curvature is defined also for the outer circumferential bent surfaces of the above-described rims.

Figure 3:
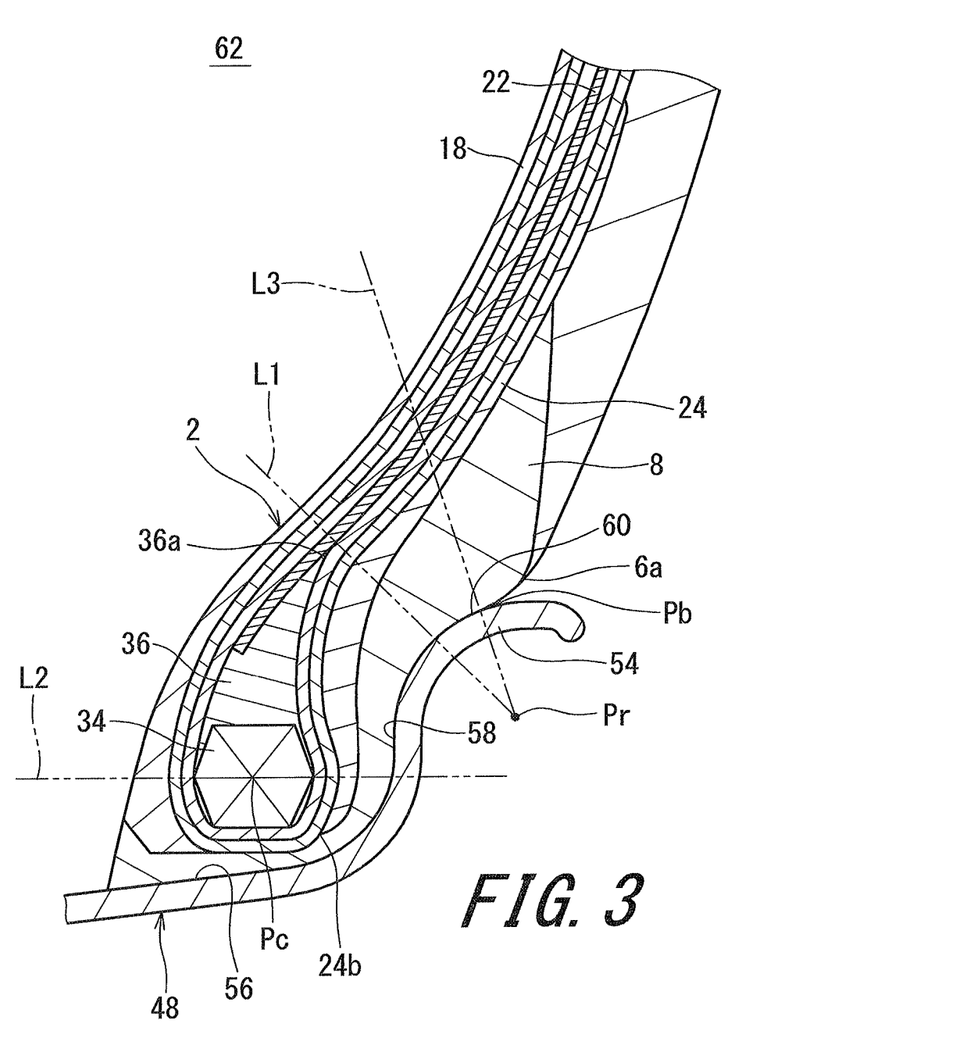
FIG. 3 is a diagram illustrating a portion of the tire, shown in FIG. 1, which is mounted to the normal rim shown in FIG. 2, and is in use.

FIG. 3 illustrates a cross-section of a portion of a tire assembly 62 having the tire 2 mounted to the rim 48. The tire 2 is inflated with air to a normal internal pressure. A load F that is 120% of the normal load is applied to the tire 2 in the radially inward direction. The tire 2 is deformed due to the normal internal pressure and the load F. The tire 2 is deformed along the shapes of the seat surfaces 56, the contact surfaces 58, and the outer circumferential bent surfaces 60 of the rim 48. Pb in FIG. 3 represents a position of the radially outer edge at which the outer surface (the outer surface of the clinch 8) of the tire 2 and the flange 54 of the rim 48 contact each other. In the present invention, the point Pb is referred to as a separation point. The separation point Pb is positioned on the outer circumferential bent surface 60. The separation point Pb is calculated in a state where the load F is applied under a normal internal pressure.

A point Pr in FIG. 3 represents the center point of the circle represented by the radius Rr of curvature of the outer circumferential bent surface 60. An alternate long and two short dashes line L1 represents a straight line that extends through the center point Pr and is tilted from the radially inner side toward the radially outer side and toward the axially inner side. The straight line L1 is a straight line that extends so as to be tilted by 45° relative to the axial direction. The straight line L1 represents a first reference line of the present invention. A point Pc represents the center point of the core 34. The center point Pc represents the mid-point between the radially outer end and the radially inner end of the core 34, and the mid-point between the axially inner end and the axially outer end of the core 34. An alternate long and two short dashes line L2 is a straight line that extends through the center point Pc in the axial direction. The straight line L2 represents a second reference line of the present invention. An alternate long and two short dashes line L3 is a straight line that extends through the separation point Pb and the center point Pr.

Figure 4:
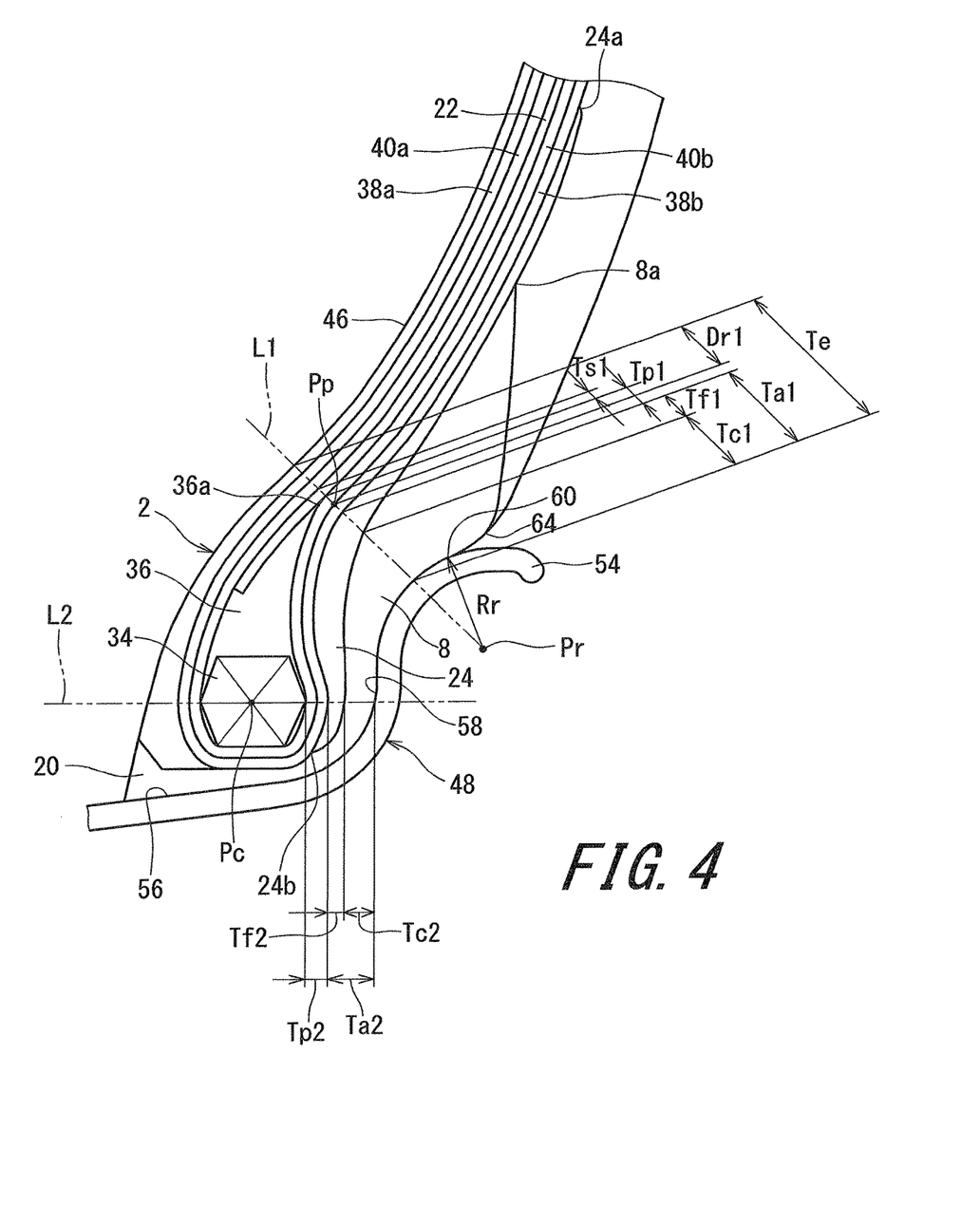
FIG. 4 is an enlarged view illustrating a portion of the tire shown in FIG. 3.

FIG. 4 is a partially enlarged view of FIG. 3. In FIG. 4, a double-headed arrow Te represents the thickness of the tire 2. The thickness Te is measured as the thickness from the inner cavity surface 46 of the tire 2 to the outer surface of the clinch 8. A double-headed arrow Tc1 represents the thickness of the clinch 8. A double-headed arrow Tf1 represents the thickness of the filler 24. A double-headed arrow Ta1 represents the thickness obtained by the thickness Tc1 and the thickness Tf1 being added. The thicknesses Te, Tc1, Tf1, and Ta1 are measured along the first reference line in a state where the tire 2 inflated to the normal internal pressure is under the load F.

A double-headed arrow Tp1 represents the thickness obtained by the thickness of the turned-up portion 38b of the carcass 12 and the thickness of the turned-up portion 40b of the carcass 12 being added. The thickness Tp1 represents the thickness of the turned-up portion of the carcass 12. A point Pp represents the center point of the thickness Tp1. A double-headed arrow Dr1 represents a distance from the inner cavity surface 46 of the tire 2 to the point Pp. The thickness Tp1 and the distance Dr1 are measured along the first reference line in a state where the tire 2 inflated to the normal internal pressure is under the load F.

A double-headed arrow Tc2 represents the thickness of the clinch 8. A double-headed arrow Tf2 represents the thickness of the filler 24. A double-headed arrow Ta2 represents the thickness obtained by the thickness Tc2 and the thickness Tf2 being added. A double-headed arrow Tp2 represents the thickness obtained by the thickness of the turned-up portion 38b of the carcass 12 and the thickness of the turned-up portion 40b of the carcass 12 being added. The thicknesses Tc2, Tf2, Ta2, and Tp2 are measured along the second reference line L2.

As shown in FIG. 3 and FIG. 4, when the load F is applied, the tire 2 is deformed along the shapes of the seat surfaces 56, the contact surfaces 58, and the outer circumferential bent surfaces 60 of the rim 48. Due to this deformation, tensile stress acts in the axially inner side of the tire 2 and compressive stress acts in the axially outer side of the tire 2. On the thickness Te, a portion of the tire 2 on the inner cavity surface 46 side is expanded, while a portion of the tire 2 on an outer surface 64 side is compressed. A load in the radial direction is applied to the tire 2, whereby the tire 2 rolls. At this time, deformation of each portion of the tire 2 is periodically repeated. The periodic deformation may cause reduction of durability of the tire 2.

The crosslinked rubber of each of the clinch 8, the filler 24, and the like has higher resistance to compressive stress than to tensile stress. The first ply 38, the second ply 40, and the like include the cords. The first ply 38 and the second ply 40 have resistance to tensile stress along a direction in which the cords extend. The first ply 38 and the second ply 40 have higher resistance to tensile stress than to compressive stress in the radial direction. In the tire 2, a ratio (Ta1/Te) of the thickness Ta1 to the thickness Te of the tire 2 is greater than 0.4 in the state shown in FIG. 4. Acting of compressive stress in the turned-up portions 38b and 40b is reduced. Thus, durability of the tire 2 is less likely to be reduced.

In the tire 2, the main portion 38a of the carcass ply 38 and the main portion 40a of the carcass ply 40 are disposed inward of the apex 36 in the axial direction. When the tire 2 is inflated with air, tensile force acts in the main portion 38a and the main portion 40a disposed inward of the apex 36 in the axial direction. The turned-up portion 38b and the turned-up portion 40b are layered outward of the small apex 36 in the axial direction. The turned-up portions 38b and 40b extend along the axially outer side surface of the apex 36. The carcass 12 and the apexes 36 are used in combination, whereby the carcass plies 38 and 40 are disposed on the axially inner side near the apex 36. Thus, the thickness Ta2 is increased, and the distance Dr1 is reduced.

In the tire 2, the distance Dr1 is reduced, whereby the first ply 38 and the second ply 40 are less likely to be damaged. In this viewpoint, a ratio (Dr1/Te) of the distance Dr1 to the thickness Te is preferably less than or equal to 0.6, and more preferably less than or equal to 0.5. Meanwhile, according to the structure of the tire 2, the ratio (Dr1/Te) is not less than 0.2.

Increase of the thickness Tf1 of the filler 24 allows deformation of the tire 2 to be reduced. The reduction of the deformation allows separation between the filler 24 and the carcass 12 and between the filler 24 and the clinch 8 to be reduced. Increase of the thickness Tf1 contributes to improvement of durability of the tire 2. In this viewpoint, a ratio (Tf1/Tc1) of the thickness Tf1 to the thickness Tc1 of the clinch 8 is preferably greater than or equal to 0.3, and more preferably greater than or equal to 0.5. Meanwhile, by the thickness Tc1 of the clinch 8 being increased, damage due to contact with the flange 54 is reduced. Damage of the filler 24 due to contact with the flange 54 is less likely to be generated. Increase of the thickness Tc1 contributes to improvement of durability of the tire 2. In this viewpoint, the ratio (Tf1/Tc1) is preferably not greater than 3.0, more preferably not greater than 2.0, and particularly preferably not greater than 1.0.

As shown in FIG. 4, when the thickness Ta2 at the second reference line L2 is increased, the turned-up portions 38b and the turned-up portions 40b of the carcass 12 are disposed on the axially inner side rather than the axially outer side. Even if the turned-up portion 38b and the turned-up portion 40b of the carcass 12 are disposed on the axially inner side at the first reference line L1, the turned-up portion 38b and the turned-up portion 40b are less likely to be bent with a small radius of curvature between the first reference line L1 and the second reference line L2. The tire 2 in which the turned-up portion is bent with a radius of curvature being increased allows reduction of separation between: the apex 36; and the turned-up portion 38b and the turned-up portion 40b. Further, damage of the carcass 12 due to contact with the flange 54 is less likely to occur. The tire 2 is excellent in durability of the carcass 12. In this viewpoint, the thickness Ta2 is preferably greater than or equal to the thickness Tp2 of the carcass 12. Meanwhile, in the tire 2 in which the thickness Ta2 is reduced, heat generation is reduced. In this viewpoint, the thickness Ta2 is preferably not greater than three times the thickness Tp2.

In the tire 2, the inner end 24b of each filler 24 is disposed inward of the inner end of the core 34 in the radial direction. Each filler 24 is held by and between the core 34 and the flange 54 on the inner end side of the filler 24. Each filler 24 is fixed on the inner end side by the core 34 and the flange 54. The fillers 24 contribute to reduction of deformation of the tire 2. In this viewpoint, the inner end 24b of each filler 24 is preferably disposed inward of the outer end of the core 34 in the radial direction. At the second reference line L2, the thickness Tf2 is preferably greater than 0. The inner end 24b may be disposed outward of the center of the core 34 in the radial direction. The thickness Tf2 may be 0 and the thickness Ta2 may be equal to the thickness Tc2. Meanwhile, from the viewpoint of reducing generation of damage due to contact with the flange 54, the thickness Tf2 is preferably less than or equal to the thickness Tc2 of the clinch 8.

Increase of the thickness Ta1 allows damage of the turned-up portion 38b and the turned-up portion 40b of the carcass 12 to be reduced. In this viewpoint, the thickness Ta1 is preferably greater than or equal to twice the thickness Tp1 of the turned-up portion at the first reference line.

Stiffness is likely to vary near the end 36a of the apex 36. Due to the variation of stiffness, distortion is likely to concentrate near the end 36a of the apex 36. Separation from the carcass 12 is likely to occur near the end 36a. In a region which is radially outward of the first reference line L1 that extends so as to be tilted by 45° relative to the axial direction, deformation due to the load F is likely to be increased. Among portions supported by the flange 54, deformation is maximum in a portion from the first reference line L1 to the straight line L3 that extends through the separation point Pb. Distortion and heat generation are likely to occur in this portion. In the tire 2, the end 36a of the apex 36 is disposed inward of the first reference line L1 in the radial direction. The apex 36 is a so-called small apex. Thus, in the tire 2, generation of damage near the end 36a is reduced. The tire 2 is excellent in durability.

Each strip 22 extends radially outward from the apex 36. Each strip 22 extends up to a region outward of the end 36a of the apex 36 in the radial direction. The outer end 22a of each strip 22 is disposed outward of the first reference line L1 in the radial direction. The thickness Ts1 of the strip 22 is greater than 0. In the tire 2, the strips 22 allow stiffness to be improved in a region outward of the first reference line L1 in the radial direction. The improvement of stiffness contributes to improvement of ride comfort and handling stability. In this viewpoint, a ratio (Ts1/Te) of the thickness Ts1 of the strip 22 to the thickness Te at the first reference line L1 is preferably greater than or equal to 0.04. When the thickness Ts1 is measured, the load F is not applied.

The thickness of each strip 22 is reduced, whereby difference in tensile stress or compressive stress generated between: the main portions 38a and 40a of the carcass 12; and the turned-up portions 38b and 40b of the carcass 12 is reduced. Thus, damage generated between the strip 22, the first ply 38, and the second ply 40 is reduced. In this viewpoint, the ratio (Ts1/Te) is preferably not greater than 0.15.

In the tire 2, the fillers 24 contribute to improvement of stiffness of the tire 2. Further, the turned-up portion 38b and the turned-up portion 40b of the carcass 12 are sandwiched between the apex 36 and the filler 24. Thus, the turned-up portion 38b and the turned-up portion 40b are fixed. By the turned-up portions 38b and 40b being fixed, tensile stress can be sufficiently generated in the main portion 38a and the main portion 40a. In the tire 2, the axially inner surface of each filler 24 is bent so as to project toward the axially inner side. Each filler 24 allows the turned-up portion 38b and the turned-up portion 40b to be firmly fixed. In the tire 2, stiffness in a range from the sidewall 6 to the bead 10 is uniformly improved. In this manner, the fillers 24 in conjunction with the apexes 36 also contribute to improvement of handling stability. The combination of the apexes 36 and the fillers 24 contributes to improvement of ride comfort provided by the tire 2. Further, each filler 24 is disposed outward of the bead 10 in the axial direction, to reinforce the bead 10. The fillers 24 allow deformation of the apexes 36 to be reduced. The fillers 24 contribute to improvement of durability of the tire 2.

In the tire 2, each strip 22 and each filler 24 extend up to a region that is radially outward of the straight line L3 that passes through the separation point Pb. The strips 22 and the fillers 24 contribute to improvement of stiffness of the tire 2. The strips 22 and the fillers 24 contribute to improvement of handling stability and ride comfort. Combination of the apexes 36 with the strips 22 and the fillers 24 allows durability to be further improved without deteriorating handling stability and ride comfort.

Figure 5:
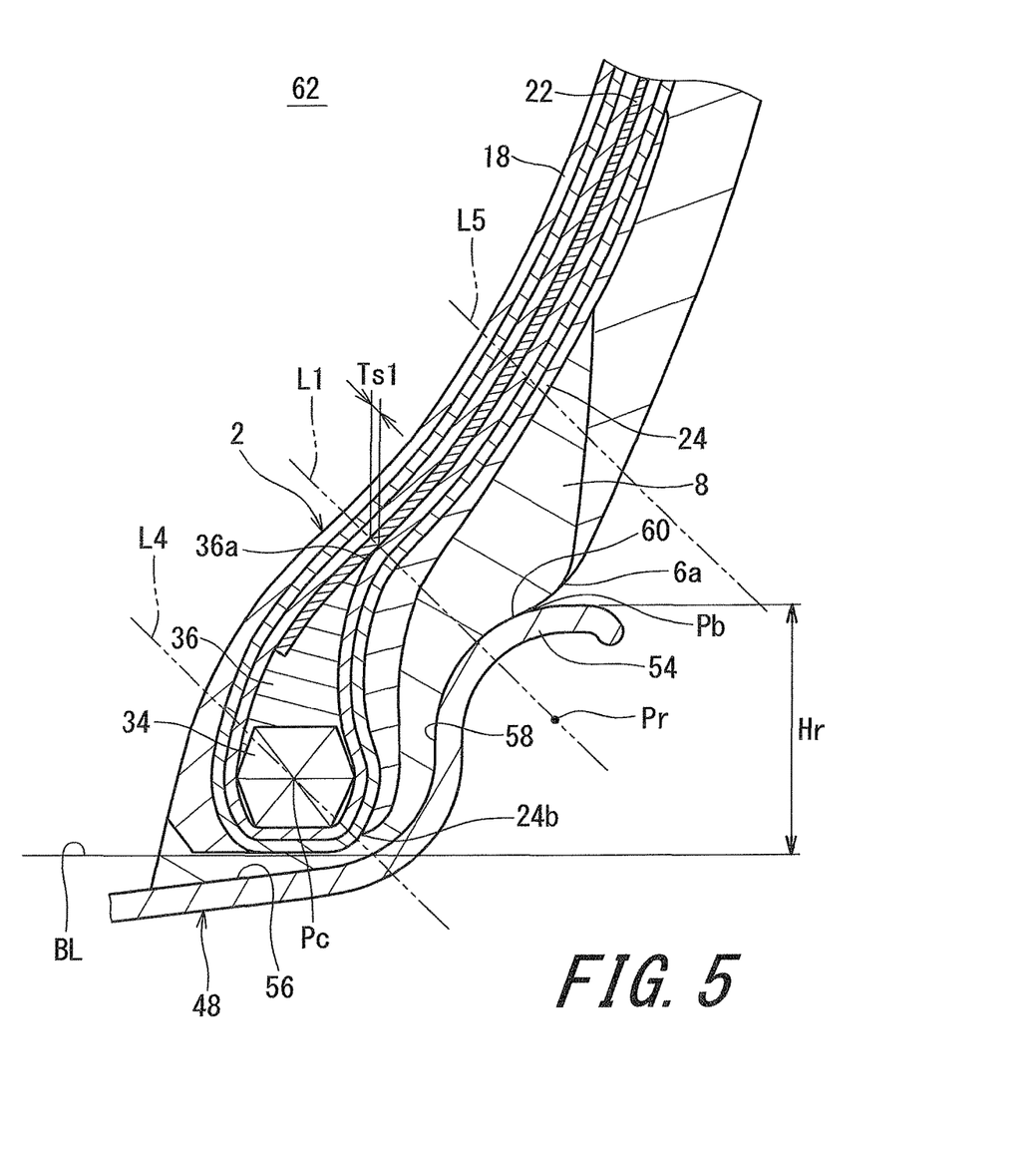
FIG. 5 is another diagram illustrating a portion of the tire, shown in FIG. 1, which is mounted to the normal rim shown in FIG. 2, and is in use.

FIG. 5 illustrates a cross-section of a portion of the tire assembly 62 having the tire 2 mounted to the rim 48. The tire assembly 62 is inflated with air to the normal internal pressure, and the load F that is 120% of the normal load is applied thereto, in the same manner as shown in FIG. 3. The tire 2 is deformed, similarly to the tire shown in FIG. 3.

In FIG. 5, a double-headed arrow Hr represents the height of the flange 54. The height Hr represents the height from the bead base line to the radially outer end of the outer circumferential bent surface 60. The height Hr is measured as a distance in straight line in the radial direction. An alternate long and two short dashes line L4 represents a straight line that extends, through the center point Pc, parallel to the first reference line L1. The straight line L4 represents a fourth reference line of the present invention. An alternate long and two short dashes line L5 represents a straight line that extends such that the straight line and the fourth reference line L4 are line-symmetric with respect to the first reference line L1. The straight line L5 represents a fifth reference line of the present invention. A double-headed arrow Ts1 represents the thickness of the strip 22. The thickness Ts1 is measured at a position that intersects the first reference line L1. When the thickness Ts1 is measured, the load F is not applied.

Figure 6:
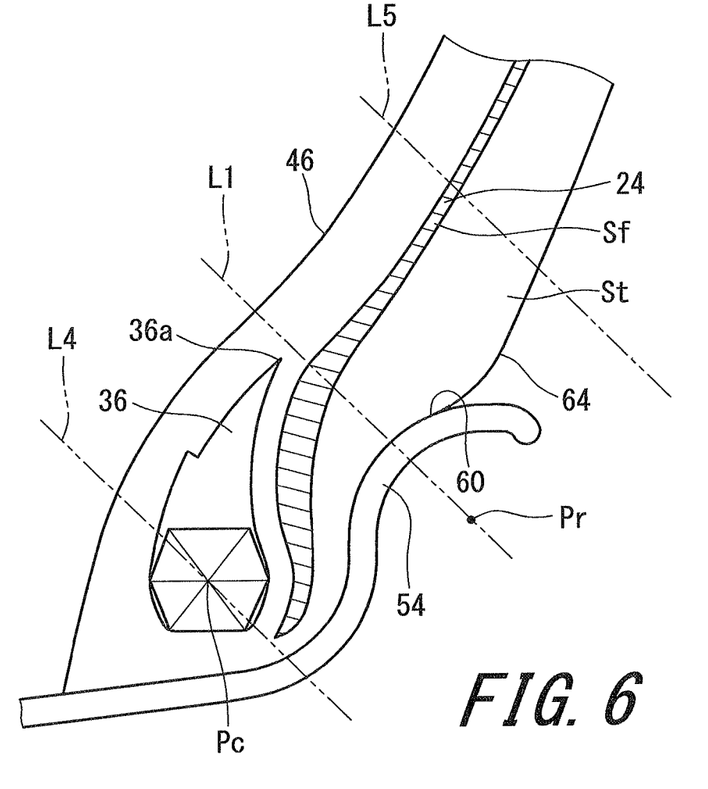
FIG. 6 is an enlarged view illustrating a portion of the tire shown in FIG. 5.

In FIG. 6, St represents a cross-sectional area of the tire 2 obtained between the first reference line L1 and the fifth reference line L5. The area St represents an area of a region surrounded by the inner cavity surface 46, the outer surface 64, the first reference line L1, and the fifth reference line L5 of the tire 2. The outer surface 64 is formed by an outer surface of the sidewall 6 and an outer surface of the clinch 8. Sf represents a cross-sectional area of the filler 24 obtained between the first reference line L1 and the fifth reference line L5. The area Sf is an area of the filler 24 in the area St. The area St and the area Sf are obtained in a state where the tire 2 inflated to the normal internal pressure is under the load F.

By rolling of the tire assembly 62, the tire 2 is deformed along the flanges 54 of the rim 48. Deformation of the tire 2 is increased in a region beyond the first reference line L1 that is tilted by an angle of 45°. In particular, a deformation amount is increased in a region between the first reference line L1 and the fifth reference line L5. In this region, distortion or heat generation is likely to be increased. In the tire 2, the end 36a of the apex 36 is disposed inward of this region in the radial direction. A deformation amount of the apex 36 is less likely to be increased. Thus, damage between the apex 36 and the carcass 12 is less likely to occur.

Each filler 24 extends, in the radial direction, from a portion inward of the first reference line L1 to a portion outward of the fifth reference line L5, to contribute to improvement of stiffness of the tire 2. By the fillers 24 being provided, even when the apex 36 is a small apex, stiffness can be sufficient. In the tire 2, the sidewalls 6 are less likely to be deformed.

When the tire 2 is in a certain deformed state, the filler 24 is deformed. Also in the certain deformed state, a deformation amount is increased in the region between the first reference line L1 and the fifth reference line L5. When the thickness of the highly hard filler 24 is increased, permanent distortion is likely to occur. The permanent distortion causes deformation of the sidewalls 6 and the tread 4. The permanent distortion may cause a flat spot. In the viewpoint of reducing generation of the flat spot, the thickness of the filler 24 is preferably reduced. In this viewpoint, in a state where the tire is mounted to the rim 48 and the tire is under the load F, a ratio (Sf/St) of the area Sf to the area St is less than or equal to 0.3.

As shown in FIG. 5, the turned-up portion 38b and the turned-up portion 40b of the carcass 12 extend along the axially outer side surface of the apex 36 such that the turned-up portions 38b and 40b are bent so as to project axially inward. When the apex 36 has a reduced height, a radius of curvature of each of the turned-up portion 38b and the turned-up portion 40b that extend so as to be bent, is reduced. When the radius of curvature is excessively reduced, damage such as loosing is likely to occur between the apex 36 and the carcass 12. In this viewpoint, as in the tire 2, the end 36a of the apex 36 is preferably disposed outward of the flange 54 of the rim 48 in the radial direction. In the tire 2, damage between the apex 36 and the carcass 12 is less likely to be generated. The tire 2 allows generation of a flat spot to be reduced, and is also excellent in durability.

As shown in FIG. 1, in the tire 2, the height Hp of the end 38c of the turned-up portion 38b of the first ply 38 is greater than the height Hf of the outer end 24a of the filler 24. Increase of a distance between the end 38c and the outer end 24a allows sudden change of stiffness near the end 38c to be reduced. In this viewpoint, a ratio ((Hp−Hf)/Hp) of a difference (Hp−Hf) of the height Hf from the height Hp relative to the height Hp is preferably greater than or equal to 0.05, and more preferably greater than or equal to 0.10.

Further, the height Hp is greater than the height Hs of the outer end 22a of the strip 22. Increase of a distance between the end 38c and the outer end 22a allows sudden change of stiffness near the end 38c to be reduced. In this viewpoint, a ratio ((Hp−Hs)/Hp) of a difference (Hp−Hs) of the height Hs from the height Hp relative to the height Hp is preferably greater than or equal to 0.05, and more preferably greater than or equal to 0.10.

As shown in FIG. 5, the outer end 22a of each strip 22 is disposed outward of the fifth reference line L5 in the radial direction. Each strip 22 extends from a portion inward of the first reference line L1 in the radial direction to a portion outward of the fifth reference line L5 in the radial direction. The strips 22 contribute to improvement of stiffness of the tire 2. By the strips 22 being provided, the thickness of the fillers 24 can be reduced and stiffness can be sufficient as compared to a case where the strip 22 is not provided.

The thickness of each strip 22 is reduced, whereby difference in tensile stress or compressive stress generated between: the main portions 38a and 40a of the carcass 12; and the turned-up portions 38b and 40b of the carcass 12 is reduced. Thus, distortion of each strip 22 is reduced. In this viewpoint, the thickness Ts1 of the strip 22 is preferably less than or equal to 2.0 mm, more preferably less than or equal to 1.5 mm, and particularly preferably less than or equal to 1.0 mm. Further, the thickness of each strip 22 is reduced, whereby the turned-up portions 38b and 40b can extend on the axially inner side.

Combination of the carcass 12 and the apexes 36 with the strips 22 and the fillers 24 allows the tire 2 to have sufficient stiffness. The strips 22 and the fillers 24 contribute to improvement of handling stability. Combination of the apexes 36 with the strips 22 and the fillers 24 allow improvement of durability and reduction of generation of a flat spot, without deteriorating handling stability.

In the present invention, the complex elastic modulus E*s of the strip 22, the complex elastic modulus E*f of the filler 24, and the complex elastic modulus E*a of the apex 36 are measured in compliance with the standard of "JIS K 6394", by using a viscoelasticity spectrometer (trade name "VESF-3" manufactured by Iwamoto Seisakusho), under the following measurement conditions. In this measurement, a plate-shaped test piece (the length=45 mm, the width=4 mm, the thickness=2 mm) is formed from a rubber composition of each of the strip 22, the filler 24, and the apex 36. This test piece is used in the measurement.

Initial strain: 10%
Amplitude: ±2.0%
Frequency: 10 Hz
Deformation mode: tension
Measurement temperature: 70° C.

In the present invention, the dimensions and angles of the components of the tire 2 are measured in a state where the tire 2 is mounted to a normal rim, and inflated with air to a normal internal pressure. During the measurement, no load is applied to the tire 2, unless otherwise specified. In the description herein, the normal rim represents a rim that is specified according to the standard with which the tire 2 complies. The "standard rim" in the JATMA standard, the "Design Rim" in the TRA standard, and the "Measuring Rim" in the ETRTO standard are included in the normal rim. In the description herein, the normal internal pressure represents an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard, are included in the normal internal pressure.

EXAMPLES

Hereinafter, effects of the present invention will become apparent according to examples. However, the present invention should not be restrictively construed based on the description of examples.

Test 1

Example 1

A tire having the structure shown in FIG. 1 was produced. The size of the tire was LT265/75R16. The ratio (Ta1/Te), the ratio (Dr1/Te), the ratio (Tc1/Tf1), and the ratio (Ts1/Te) of the tire in a state where the tire was mounted to a 7.5 J normal rim, was inflated to the normal internal pressure, and was under 120% of the normal load, were as indicated in Table 1.

Comparative Example 1

A commercially available conventional tire was prepared. The tire had no strip and no filler. The end of the apex of the tire was extended up to a region that was radially outward of the first reference line L1. The other components were the same as for Example 1.

Examples 2 to 3

Tires were produced in the same manner as for example 1 except that the ratio (Tc1/Tf1) was as indicated in Table 1.

Comparative Example 2

A tire was produced in the same manner as for example 1 except that the ratio (Ta1/Te), the ratio (Dr1/Te), the ratio (Tc1/Tf1), and the ratio (Ts1/Te) were as indicated in Table 1.

Example 4

A tire was produced in the same manner as for example 1 except that the ratio (Ta1/Te), the ratio (Dr1/Te), and the ratio (Ts1/Te) were as indicated in Table 1.

[Durability]

Each tire was mounted to a normal rim, and was inflated with air to an internal pressure of 550 kPa. The tire was mounted to a drum type tire testing machine, and a vertical load of 20 kN was applied to the tire. Running with the tire on the drum at a speed of 100 km/h was performed. The running with the tire over 30000 km was performed and durability was evaluated. The durability is indicated as indexes in Table 1. The index represents 100 in a case where the whole distance was run. In a case where the tire was damaged before the whole distance was run, the index is indicated based on a running distance measured when the tire was damaged. The greater a value of the index is, the better the result is. Further, the tire was cut after the running, and checked for presence or absence of damage such as separation at the apex and the carcass.

[Handling Stability and Ride Comfort]

Each tire was mounted to a normal rim, and mounted to a rear wheel of a light truck. The tire was inflated with air to an internal pressure of 550 kPa. Commercially available tires were mounted to front wheels as they were. The tires of the front wheels were inflated with air to an internal pressure of 340 kPa. In a state where each tire was under a load of 11.38 kN, a driver was caused to evaluate handling stability and ride comfort. For this evaluation, the light truck was caused to run over 5 km, and the driver made sensory evaluation. The results are indicated below as indexes in Table 1. Handling stability and ride comfort are evaluated with the evaluation result of Comparative example 1 being 100. The greater a value of the index is, the better the result is.

TABLE 1

| | Evaluation results | | | | | |
|---|---|---|---|---|---|---|
| | Comparative example 1 | Comparative example 2 | Example 2 | Example 1 | Example 3 | Example 4 |
| Ratio (Ta1/Te) | 0.24 | 0.29 | 0.43 | 0.43 | 0.43 | 0.40 |
| Ratio (Dr1/Te) | 0.75 | 0.70 | 0.50 | 0.50 | 0.50 | 0.53 |
| Ratio (Tc1/Tf1) | — | 0.74 | 0.16 | 0.75 | 3.5 | 0.75 |
| Ratio (Ts1/Te) | — | 0.063 | 0.063 | 0.063 | 0.063 | 0.18 |
| Durability | 77 | 85 | 92 | 100 | 88 | 96 |
| Handling stability | 100 | 110 | 105 | 106 | 112 | 115 |
| Ride comfort | 100 | 108 | 103 | 105 | 109 | 98 |

In the test for durability, no damage was found in the tire of Example 1. In the tires of Comparative example 1 and Comparative example 2, loosing was found in the turned-up portions of the carcasses. In the tires of Example 2 and Example 3, separation was found in the fillers. In the tire of Example 4, loosing between the turned-up portion of the carcass and the strip was found.

Test 2

Example 5

A tire having the structure shown in FIG. 1 was produced. The size of the tire was LT265/75R16. The thickness Te, the thickness Tf1, the thickness Tc1, the thickness Tp1, the ratio (Ta1/Te), the ratio (Dr1/Te), the ratio (Tc1/Tf1), and the ratio (Tc1/Tp1) of the tire in a state where the tire was mounted to a 7.5 J normal rim, was inflated to the normal internal pressure, and was under 120% of the normal load, were as indicated in Table 2.

Comparative Example 3

A commercially available conventional tire was prepared. The tire had no strip and no filler. The end of the apex of the tire was extended up to a region that was radially outward of the first reference line L1. The thickness Tc1, the thickness Tp1, the ratio (Ta1/Te), the ratio (Dr1/Te), and the ratio (Tc1/Tp1) of the tire were as indicated in Table 2. The other components were the same as for Example 5.

Examples 6 to 8 and Comparative Example 4

Tires were produced such that the thickness Tf1, the thickness Tc1, and the thickness Tp1 were as indicated in Table 2, and the ratio (Ta1/Te), the ratio (Dr1/Te), the ratio (Tc1/Tf1), and the ratio (Tc1/Tp1) were as indicated in Table 2. The other components were the same as for Example 5.

[Durability]

The tires were evaluated for durability under the same test conditions as in test 1. The durability is indicated as indexes in Table 2 with the evaluation result of the tire of Example 5 being 100. The greater a value of the index is, the better the result is.

TABLE 2

| | Evaluation results | | | | | |
|---|---|---|---|---|---|---|
| | Comparative example 3 | Example 5 | Example 6 | Example 7 | Example 8 | Comparative example 4 |
| Te (mm) | 12 | 12 | 12 | 12 | 12 | 12 |
| Tf1 (mm) | 0 | 2 | 3 | 4 | 2 | 6 |
| Tc1 (mm) | 3 | 5 | 4 | 3 | 4 | 1 |
| Tp1 (mm) | 2 | 2 | 2 | 2 | 3 | 2 |
| Ratio (Ta1/Te) | 0.25 | 0.58 | 0.58 | 0.58 | 0.50 | 0.58 |
| Ratio (Dr1/Te) | 0.67 | 0.33 | 0.33 | 0.33 | 0.42 | 0.33 |
| Ratio (Tc1/Tf1) | — | 0.40 | 0.75 | 1.33 | 0.50 | 6.0 |
| Ratio (Tc1/Tp1) | 1.5 | 2.5 | 2.0 | 1.5 | 1.33 | 0.5 |
| Durability | 77 | 100 | 100 | 96 | 90 | 77 |

In the test for durability, no damage was found in the tires of Example 5 and Example 6. In the tires of Comparative example 3, Comparative example 4, Example 7, and Example 8, loosing was found in the turned-up portions of the carcasses.

Test 3

Example 9

A tire having the structure shown in FIG. 1 was produced. The size of the tire was LT265/75R16. The thickness Ta2, the thickness Tp2, the thickness Tf2, the thickness Tc2, the thickness Ta1, the thickness Tp1, the ratio (Ta2/Tp2), the ratio (Tf2/Tc2), and the ratio (Ta1/Tp1) of the tire in a state where the tire was mounted to a 7.5 J normal rim, was inflated to the normal internal pressure, and was under 120% of the normal load, were as indicated in Table 3.

Examples 10 to 14

Tires were produced such that the thickness Ta2, the thickness Tp2, the thickness Tf2, the thickness Tc2, the thickness Ta1, the thickness Tp1, the ratio (Ta2/Tp2), the ratio (Tf2/Tc2), and the ratio (Ta1/Tp1) were as indicated in Table 3. The other components were the same as for Example 9.

[Durability]

The tires were evaluated for durability under the same test conditions as in test 1. The durability is indicated as indexes in Table 3 with the evaluation result of the tire of Example 10 being 100. Further, for the tires of Example 9, Example 10, and Example 14, the running distance was extended until the tires were damaged, and the durability was compared and evaluated. The greater a value of the index is, the better the result is.

TABLE 3

| | Evaluation results | | | | | |
|---|---|---|---|---|---|---|
| | Example 9 | Example 10 | Example 11 | Example 12 | Example 13 | Example 14 |
| Ta2 (mm) | 3 | 3 | 3 | 3 | 3 | 3 |
| Tp2 (mm) | 2.5 | 2.5 | 2.5 | 2.5 | 2.5 | 2.5 |
| Tf2 (mm) | 1 | 1 | 1 | 1 | 1 | 1 |
| Tc2 (mm) | 2 | 2 | 2 | 2 | 2 | 2 |
| Ta1 (mm) | 7 | 5 | 4 | 3 | 2 | 5 |
| Tp1 (mm) | 2.5 | 2.5 | 2.5 | 2.5 | 2.5 | 2 |
| Ratio (Ta2/Tp2) | 1.2 | 1.2 | 1.2 | 1.2 | 1.2 | 1.2 |
| Ratio (Tf2/Tc2) | 0.5 | 0.5 | 0.5 | 0.5 | 0.5 | 0.5 |
| Ratio (Ta1/Tp1) | 2.8 | 2.0 | 1.6 | 1.2 | 0.8 | 2.5 |
| Durability | 105 | 100 | 100 | 97 | 88 | 103 |

In the test for durability, when the running over 30000 km had been performed, no damage was found in the tires of Example 9, Example 10, and Example 14. In the tires of Example 11, Example 12, and Example 13, loosing was found in the turned-up portions of the carcasses and the apexes.

As indicated in Table 1 to Table 3, the tires of Examples are superior in durability to the tires of Comparative examples. As indicated in Table 1, when the fillers and the strips are provided, the tires are superior also in handling stability and ride comfort. The evaluation results clearly indicate that the present invention is superior.

Test 4

Example 15

A tire having the structure shown in FIG. 1 was produced. The size of the tire was LT265/75R16. In tables, "A" indicated in position of end of apex represents a position inward of the first reference line L1 in the radial direction and outward of the outer end of the flange of the rim in the radial direction. A ratio (Sf/St) of the area Sf of the filler to the area St of the tire in a region between the first reference line L1 and the fifth reference line L5, was 0.2. The thickness Ts1 of the strip at the first reference line L1 was 1.0 mm. A ratio ((Hp−Hf)/Hp) of a difference (Hp−Hf) of the height Hf of the outer end of the filler from the height Hp of the outer end of the turned-up portion of the carcass ply relative to the height Hp, was 0.22.

Comparative Example 5

A commercially available conventional tire was prepared. In the tables, "B" indicated in position of end of apex represents a position outward of the first reference line L1 in the radial direction. The tire had no strip and no filler. For the tire, the area Sf represents an area of the apex between the first reference line L1 and the fifth reference line L5. The ratio (Sf/St) represents a ratio of the area of the apex to the area St. The ratio (Sf/St) was 0.4. The other components were the same as for Example 15.

Comparative Example 6

A tire was produced in the same manner as for example 15 except that the position of the end of the apex was "B" as in Comparative example 5.

Comparative Example 7

A tire was produced in the same manner as for example 15 except that the ratio (Sf/St) was as indicated in Table 4.

Example 16

A tire was produced in the same manner as for example 15 except that the ratio ((Hp−Hf)/Hp) was as indicated in Table 4.

Example 17

A tire was produced in the same manner as for example 15 except that the thickness Ts1 of the strip was as indicted in Table 4.

Example 18

A tire was produced in the same manner as for example 15 except that no strip was provided.

Example 19

A tire was produced in the same manner as for example 15 except that the position of the end of the apex was as indicated in Table 5. In the table, "C" indicated in position of end of apex represents a position inward of the flange of the rim in the radial direction.

[Durability]

The tires were evaluated for durability under the same test conditions as in test 1. The durability is indicated as indexes in Table 4 and Table 5. The index represents 100 in a case where the whole distance was run. In a case where the tire was damaged before the whole distance was run, the index is indicated based on a running distance measured when the tire was damaged. The greater a value of the index is, the better the result is. Further, the tire was cut after the running, and checked for presence or absence of damage such as separation at the apex and the carcass.

[Flat Spot Performance]

Each tire was mounted to a normal rim, and a radial force variation (RFV) for the tire was measured in compliance with JASO C607. An internal air pressure was 550 kPa in the tire. An initial RFV for the tire was measured. After the initial RFV was measured, the tire was pressed against a plane road surface for a predetermined time period in a stationary state where the tire was under 75% of the maximum applied load. Thereafter, the RFV after the load had been applied, was measured. The initial RFV was subtracted from the RFV after the load had been applied, to calculate a difference in RFV. The results are indicated as indexes with a difference in RFV in Comparative example 5 being 100. The less a value of this index is, the less the difference in RFV is, that is, the less generation of a flat spot becomes.

[Handling Stability]

The tires were evaluated for handling stability under the same test conditions as in test 1. The results are indicated below as indexes in Table 4 and Table 5. The handling stability was evaluated with the evaluation result of Comparative example 5 being 100. The greater a value of the index is, the better the result is.

TABLE 4

Evaluation results

|  | Comparative example 5 | Example 15 | Comparative example 6 | Comparative example 7 | Example 16 | Example 17 |
|---|---|---|---|---|---|---|
| Position of end of apex | B | A | B | A | A | A |
| Ratio (Sf/St) | 0.4 | 0.2 | 0.2 | 0.35 | 0.2 | 0.2 |
| Filler | absent | Present | Present | Present | present | present |
| Ratio ((Hp−Hf)/Hp) | — | 0.22 | 0.22 | 0.22 | 0 | 0.22 |
| Strip | absent | Present | Present | Present | present | present |
| Ts1(mm) | — | 1.0 | 1.0 | 1.0 | 1.0 | 3.0 |
| Durability | 75 | 100 | 100 | 98 | 100 | 100 |
| Flat spot performance | 100 | 80 | 98 | 95 | 90 | 92 |
| Handling stability | 100 | 102 | 103 | 101 | 100 | 100 |

TABLE 5

Evaluation results

|  | Example 18 | Example 19 |
|---|---|---|
| Position of end of apex | A | C |
| Ratio (Sf/St) | 0.2 | 0.2 |
| Filler | present | Present |
| Ratio ((Hp − Hf)/Hp) | 0.22 | 0.22 |
| Strip | absent | Present |
| Ts1 (mm) | — | 1.0 |
| Durability | 103 | 98 |
| Flat spot performance | 80 | 80 |
| Handling stability | 98 | 98 |

In the test for durability, no damage was found in the tires of Example 15, Example 16, and Example 18. In the tires of Comparative examples 5 to 7, and the tires of Examples 17 and 19, loosing was found in the apexes and the turned-up portions of the carcasses.

As indicated in Table 4 and Table 5, the tires of Examples are superior in flat spot performance to the tires of Comparative examples. Further, in the tires of Examples, durability and handling stability are less likely to be deteriorated. The evaluation results clearly indicate that the present invention is superior.

The foregoing description is in all aspects illustrative, and various modifications can be devised without departing from the essential features of the invention.

While the above-described method is widely applicable to vehicles including passenger cars, the method is particularly suitable to tires, such as tires of light trucks, trucks, buses, and the like, to which heavy load is applied.

What is claimed is:

1. A pneumatic tire comprising: a tread; a pair of sidewalls; a pair of clinches; a pair of beads; a carcass; and a pair of fillers, wherein
    each sidewall extends almost inward from an end of the tread in a radial direction,
    each clinch is disposed inward of a corresponding one of the sidewalls in the radial direction, each bead is disposed inward of a corresponding one of the clinches in an axial direction, and each bead includes a core, and an apex that extends outward from the core in the radial direction, the carcass extends along inner sides of the tread and the sidewalls, and is extended on and between one of the beads and the other of the beads, and the carcass includes a carcass ply, wherein the carcass ply is turned up around the core from an inner side toward an outer side in the axial direction, and the carcass ply includes: a main portion disposed inward of the beads in the axial direction; and turned-up portions disposed outward of the beads in the axial direction, each filler is disposed between a corresponding one of the clinches and a corresponding one of the turned-up portions in the axial direction, an inner end of each filler in the radial direction is disposed inward of an outer end of the core, each filler is layered over the turned-up portion from an inner end to an outer end, and the filler is in direct contact with the carcass over the entire radial extent of the filler, Hp represents a height of an outer end of each turned-up portion of the carcass ply, and Hf represents a height of an outer end of each filler, the height Hp is greater than the height Hf, and a ratio ((Hp−Hf)/Hp) of a difference (Hp−Hf) of the height Hf from the height Hp relative to the height Hp is greater than or equal to 0.05, a normal rim to which the tire is mounted, includes a flange, wherein the flange forms an outer circumferential bent surface that is bent with a radius Rr of curvature, a radially outer side edge that contacts a corresponding one of the clinches is positioned on the outer circumferential bent surface, a first reference line L1 represents a straight line that extends through a center point Pr of a circle represented by the radius Rr of curvature, and that is tilted, by an angle of 45° relative to the axial direction, from an inner side in the radial direction toward an outer side in the radial direction and toward an inner side in the axial direction, and the axially inner surface of the filler is bent so as to project axially inward, in a region which is inward of the first reference line L1 in the radial direction, and a radially outer end of the apex is disposed inward of the first reference line L1 in the radial direction, in a state where the tire is mounted to the normal rim, is inflated to a normal internal pressure, and is under 120% of a normal load, Te represents a thickness from an inner cavity surface to an outer surface of a corresponding one of the clinches, Tf1 represents a thickness of each filler, Tc1 represents a thickness of each clinch, Ta1 represents a thickness obtained by the thickness Tf1 and the thickness Tc1 being added, and the thicknesses Te, Tf1, Tc1, and Ta1 are measured along the first reference line L1, and a ratio (Ta1/Te) of the thickness Ta1 to the thickness Te is greater than 0.4.

2. The tire according to claim 1, wherein a ratio (Tf1/Tc1) of the thickness Tf1 to the thickness Tc1 is greater than or equal to 0.3 and not greater than 3.0.

3. The tire according to claim 1, wherein
an outer end, of each turned-up portion, in the radial direction is disposed outward of the first reference line L1 in the radial direction, and
when Dr1 represents a distance from the inner cavity surface to a center point Pp of a thickness of each turned-up portion along the first reference line L1, a ratio (Dr1/Te) of the distance Dr1 to the thickness Te is less than or equal to 0.6.

4. The tire according to claim 1, wherein
a second reference line L2 represents a straight line that extends through a center of the core in the axial direction,
in a state where the tire is mounted to the normal rim, is inflated to a normal internal pressure, and is under 120% of a normal load,
Tp2 represents a thickness of the carcass ply, Tf2 represents a thickness of each filler, Tc2 represents a thickness of each clinch, Ta2 represents a thickness obtained by the thickness Tf2 and the thickness Tc2 being added, and the thicknesses Tp2, Tf2, Tc2, and Ta2 are measured along the second reference line L2, and
the thickness Ta2 is greater than or equal to the thickness Tp2, and is not greater than three times the thickness Tp2.

5. The tire according to claim 4, wherein the thickness 112 is greater than 0, and is less than or equal to the thickness Tc2.

6. The tire according to claim 1, wherein, when Tp1 represents a thickness of the carcass ply, and the thickness Tp1 is measured along the first reference line L1, the thickness Ta1 is greater than or equal to twice the thickness Tp1.

7. The tire according to claim 1, wherein a radially outer end of the apex is disposed inward of the first reference line L1 in the radial direction.

8. The tire according to claim 7, comprising a strip, the strip is layered over the apex, the strip extends outward from an end of the apex in the radial direction, and a radially outer end of the strip is disposed outward of the first reference line L1 in the radial direction.

9. A pneumatic tire comprising: a tread; a pair of sidewalls; a pair of clinches; a pair of beads; a carcass; and a pair of fillers, wherein
each sidewall extends almost inward from an end of the tread in a radial direction,
each clinch is disposed inward of a corresponding one of the sidewalls in the radial direction,
each bead is disposed inward of a corresponding one of the clinches in an axial direction, and each bead includes a core, and an apex that extends outward from the core in the radial direction,
the carcass extends along inner sides of the tread and the sidewalls, and is extended on and between one of the beads and the other of the beads, and the carcass includes a carcass ply, wherein the carcass ply is turned up around the core from an inner side toward an outer side in the axial direction, and the carcass ply includes: a main portion disposed inward of the beads in the axial direction; and turned-up portions disposed outward of the beads in the axial direction,
each filler is disposed between a corresponding one of the clinches and a corresponding one of the turned-up portions in the axial direction, an inner end of each filler in the radial direction is disposed inward of an outer end of the core, each filler is layered over the turned-up portion from an inner end to an outer end, and the filler is in direct contact with the carcass over the entire radial extent of the filler,
Hp represents a height of an outer end of each turned-up portion of the carcass ply, and Hf represents a height of an outer end of each filler, the height Hp is greater than the height Hf, and a ratio ((Hp−Hf)/Hp) of a difference (Hp−Hf) of the height Hf from the height Hp relative to the height Hp is greater than or equal to 0.05, a normal rim to which the tire is mounted, includes a flange, wherein the flange forms an outer circumferential bent surface that is bent with a radius Rr of curvature, a radially outer side edge that contacts a corresponding one of the clinches is positioned on the outer circumferential bent surface, a first reference line L1 represents a straight line that extends through a center point Pr of a circle represented by the radius Rr of curvature, and that is tilted, by an angle of 45° relative to the axial direction, from an inner side in the radial direction toward an outer side in the radial direction and toward an inner side in the axial direction, and the axially inner surface of the filler is bent so as to project axially inward, in a region which is inward of the first reference line L1 in the radial direction, and a radially outer end of the apex is disposed inward of the first reference line L1 in the radial direction, a fourth reference line L4 represents a straight line that extends, through a center of the core, parallel to the first reference line L1, a fifth reference line L5 represents a straight line that extends such that the straight line and the fourth reference line L4 are line-symmetric with respect to the first reference line L1, in a state where the tire is mounted to the normal rim, is inflated to a normal internal pressure, and is under 120% of a normal load, each filler extends from a portion inward of the first reference line L1 in the radial direction to a portion outward of the fifth reference line L5 in the radial direction, and a ratio (Sf/St) of an area Sf of each filler between the first reference line L1 and the fifth reference line L5 relative to an area St of the tire between the first reference line L1 and the fifth reference line L5, is less than or equal to 0.3, and an end of the apex is disposed inward of the first reference line L1 in the radial direction.

10. The tire according to claim 9, wherein the end of the apex is disposed outward of the flange of the normal rim in the radial direction.

11. The tire according to claim 9, comprising a strip, the strip is layered over the apex, the strip extends outward from the end of the apex in the radial direction, an outer end of the strip is disposed outward of the first reference line L1 in the radial direction, and a thickness of the strip is greater than 0 and less than or equal to 2 mm.

* * * * *